United States Patent
Wu et al.

(10) Patent No.: US 8,204,532 B2
(45) Date of Patent: Jun. 19, 2012

(54) ADAPTIVE POWER CONTROL DATA TRANSMISSION SYSTEMS AND METHODS

(75) Inventors: Jianming Wu, Kanata (CA); Wen Tong, Ottawa (CA); Peiying Zhu, Kanata (CA)

(73) Assignee: Rockstar Bidco, LP, New York, NY (US)

( * ) Notice: Subject to any disclaimer, the term of this patent is extended or adjusted under 35 U.S.C. 154(b) by 1085 days.

(21) Appl. No.: 12/088,774

(22) PCT Filed: Sep. 27, 2006

(86) PCT No.: PCT/CA2006/001587
§ 371 (c)(1),
(2), (4) Date: Mar. 31, 2008

(87) PCT Pub. No.: WO2007/036031
PCT Pub. Date: Apr. 5, 2007

(65) Prior Publication Data
US 2008/0254760 A1 Oct. 16, 2008

Related U.S. Application Data

(60) Provisional application No. 60/722,652, filed on Sep. 30, 2005.

(51) Int. Cl.
*H04W 52/24* (2009.01)
*H04W 52/26* (2009.01)
(52) U.S. Cl. .......... 455/522; 455/69; 455/70; 455/67.11
(58) Field of Classification Search .................. None
See application file for complete search history.

(56) References Cited

U.S. PATENT DOCUMENTS

| | | | |
|---|---|---|---|
| 6,865,393 B1 | 3/2005 | Baum et al. | |
| 7,047,032 B2 * | 5/2006 | Yun | 455/522 |
| 7,486,634 B2 * | 2/2009 | Itoh | 455/522 X |
| 2003/0104831 A1 * | 6/2003 | Razavilar et al. | 455/522 |
| 2004/0100911 A1 | 5/2004 | Kwan et al. | |
| 2004/0141481 A1 | 7/2004 | Lee et al. | |
| 2005/0025254 A1 * | 2/2005 | Awad et al. | 375/295 |

OTHER PUBLICATIONS

IS-95, EIA/TIA-95 Rev A, "Mobile Station-base Station Compatibility Standard for Dual-mode Wideband Spread Spectrum Cellular System", 1995.
Physical Layer Standard for cdma2000 Spread Spectrum Systems, TR45.5.3.1, Jun. 14-18, 1999.

* cited by examiner

*Primary Examiner* — Philip Sobutka (57) ABSTRACT

Systems and methods of performing power control in combination with AMC are provided. AMC is performed on the basis of an AMC parameter such as CINR. Once the AMC is set to a highest available AMC for transmission to a given receiver, if the CINR indicates that the highest AMC could be transmitted with less transmit power, the power is reduced. For receivers that are not receiving the highest available AMC for that receiver, they may have their transmit power increased.

19 Claims, 6 Drawing Sheets

ADAPTIVE POWER CONTROL DATA TRANSMISSION SYSTEMS AND METHODS

RELATED APPLICATIONS

This application claims the benefit of and is a National Phase Entry of International Application No. PCT/CA2006/001587 filed on Sep. 27, 2006, and claims the benefit of United States Provisional Application No. 60/722,652 filed on Sep. 30, 2005, which documents are both incorporated herein by reference in their entirety.

FIELD OF THE INVENTION

The invention relates to systems and methods for performing adaptive power control.

BACKGROUND OF THE INVENTION

Power control was first used in IS-95 (see EIA/TIA-95 Rev A, "Mobile station-base station compatibility standard for dual-mode wideband spread spectrum cellular system", 1995) and then in CDMA-2000 for voice services. The main purpose was to balance the received power to be close to a constant level, resulting in a consistent voice quality.

In data communications, instead of power control, rate control techniques have been employed, for example, in high speed down-link packet access (HSDPA). See Physical Layer Standard for cdma2000 Spread Spectrum Systems, TR45.5.3.1, Jun. 14-18, 1999. With rate control techniques, a fixed transmit power is used, but more or less aggressive coding and/or modulation order is employed.

SUMMARY OF THE INVENTION

According to one broad aspect, the invention provides a method comprising: receiving a respective reported AMC (adaptive modulation and coding) parameter each from a plurality of receivers; decreasing a transmit power used to transmit to a given receiver of the plurality of receivers when the reported AMC parameter received from that receiver reflects better channel conditions than needed for a highest available AMC code set for that receiver.

In some embodiments, the method further comprises: increasing a transmit power used to transmit to a given receiver of the plurality of receivers when the reported AMC parameter received from that receiver is below an APC (adaptive power control) threshold for the receiver, subject to a transmission power cap for the given receiver.

In some embodiments, the method further comprises: determining an AMC code set to use for transmissions to each receiver based on the respective reported AMC parameter.

In some embodiments, the method further comprises: transmitting a composite signal for multiple receivers of said plurality of receivers, the composite signal containing a respective component for each of the multiple receivers, each component being transmitted with the transmit power determined for that receiver.

In some embodiments, each component is used to transmit a respective data packet or portion of a packet.

In some embodiments, the composite signal comprises an OFDM signal, and wherein each respective component comprises at least one sub-channel defined within the OFDM signal.

In some embodiments, the reported AMC parameter is a reported CINR (carrier to interference and noise ratio), and the method further comprising: for each receiver, comparing the reported CINR to an AMC threshold for the receiver to determine whether the receiver has a reported AMC parameter reflecting better channel conditions than needed for the highest available AMC code set for that receiver.

In some embodiments, the method further comprises: setting the transmission power cap to be an equal value for a set of the receivers.

In some embodiments, the method further comprises: adaptively setting the transmission power cap for at least one receiver.

In some embodiments, adaptively setting the transmission power cap for at least one receiver comprises: determining a value from received block error rate and/or channel variation and/or coverage information; scaling the value determined so as to reflect how many receivers will be transmitted to during a given period to produce the transmission power cap.

In some embodiments, adaptively setting the transmission power cap for each receiver is performed subject to an overall maximum transmit power constraint for the receivers collectively.

According to another broad aspect, the invention provides a method comprising: determining an AMC (adaptive modulation and coding) parameter for each of a plurality of transmitters; sending a power control command to decrease a transmit power used to transmit by a given transmitter of the plurality of transmitters when the AMC parameter determined for that transmitter reflects better channel conditions than needed for a highest available AMC code set for that transmitter.

In some embodiments, the method further comprises: sending a power control command to increase a transmit power used to transmit by a given transmitter of the plurality of transmitters when the AMC parameter determined for that transmitter is below an APC (adaptive power control) threshold for the transmitter, subject to a transmission power cap for the given transmitter.

In some embodiments, the method further comprises: receiving a composite signal for multiple transmitters of said plurality of transmitters, the composite signal containing a respective component for each of the multiple transmitters added together over the air, each component being transmitted with the transmit power determined for that transmitter.

In some embodiments, each component is used to transmit a respective packet or portion of a packet.

In some embodiments, the composite signal comprises an OFDM signal, and wherein each respective component comprises at least one sub-channel defined within the OFDM signal.

In some embodiments, the determined AMC parameter is a CINR (carrier to interference and noise ratio), and the method further comprising: for each transmitter, comparing the determined CINR to an AMC threshold for the transmitter to determine whether the transmitter has a AMC parameter reflecting better channel conditions than needed for the highest available AMC code set for the transmitter.

In some embodiments, the method further comprises: setting the transmission power cap to be an equal value for a set of the transmitters.

In some embodiments, the method further comprises: adaptively setting the transmission power cap for each transmitter.

According to another broad aspect, the invention provides a transmitter comprising: an adaptive modulation and coder that performs adaptive modulation and coding using a selected AMC code set; a first power controller that performs power control for transmissions as a function of a first AMC parameter to produce a power controlled signal; at least one antenna for transmitting the power controlled signal.

In some embodiments, an AMC (adaptive modulation and coding) parameter extraction and processing module for DL (downlink) that extracts the first AMC parameter as an AMC parameter for DL from a received signal and determines the selected AMC code set use in transmissions to a given receiver; the first power controller is a DL power controller that performs DL power control for downlink transmissions as a function of the AMC parameter for DL to produce the power controlled signal.

In some embodiments, the base station further comprises: an AMC parameter determination module for UL (uplink) that determines an AMC parameter for UL in respect of a received signal; and a UL power controller that performs UL power control as a function of the AMC parameter for UL; wherein the at least one antenna is used for receiving the received signal and transmitting the power controlled signal.

In some embodiments, the DL power controller performs DL power control for downlink transmissions as a function of the AMC parameter for DL by: a) decreasing a transmit power used to transmit to a given receiver of the plurality of receivers when the reported AMC parameter for DL received from that receiver reflects better channel conditions than needed for a highest available AMC code set for the receiver; and b) increasing a transmit power used to transmit to a given receiver of the plurality of receivers when the reported AMC parameter for DL received from that receiver is below an APC (adaptive power control) threshold for the receiver, subject to a transmission power cap for the given receiver; the UL power controller power control performs UL power control as a function of the AMC parameter for UL by: c) sending a power control command to decrease a transmit power used to transmit by a given transmitter of the plurality of transmitters when the AMC parameter for UL determined for that transmitter reflects better channel conditions than needed for a highest available AMC code set for the transmitter; and d) sending a power control command to increase a transmit power used to transmit by a given transmitter of the plurality of transmitters when the AMC parameter for UL determined for that transmitter is below an APC (adaptive power control) threshold for the transmitter, subject to a transmission power cap for the given transmitter.

In some embodiments, a mobile station comprising the transmitter further comprises: an AMC parameter determination module for DL that determines an AMC parameter for DL in respect of a received signal and sends this to a base station; the mobile station further comprising: a power control and AMC command extraction and processing module that extracts AMC commands and power control commands from the received signal; an adaptive modulation and coder that performs adaptive modulation and coding using a code set identified by the AMC command; wherein the first power controller is a UL power controller that performs power control using the power control commands to produce the power controlled signal; wherein the at least one antenna is used for receiving the received signal and transmitting the power controlled signal.

BRIEF DESCRIPTION OF THE DRAWINGS

Embodiments of the invention will now be described with reference to the attached drawings in which.

DETAILED DESCRIPTION OF THE PREFERRED EMBODIMENTS

Due to the code set limitation, some existing systems such as HSDPA do not supply high order modulation. For example, in HSDPA, the highest modulation order is 16QAM. For VoIP packets, the highest modulation order is two (QPSK). Assuming the channel condition is good enough that an even higher modulation order could be supported if not for the system constraint that the higher modulation is not available, effectively the 16QAM transmission will proceed with a higher power than is actually needed. This could result in a waste of transmission power and may also cause unnecessarily high interference to other users or cells.

Figure 1:
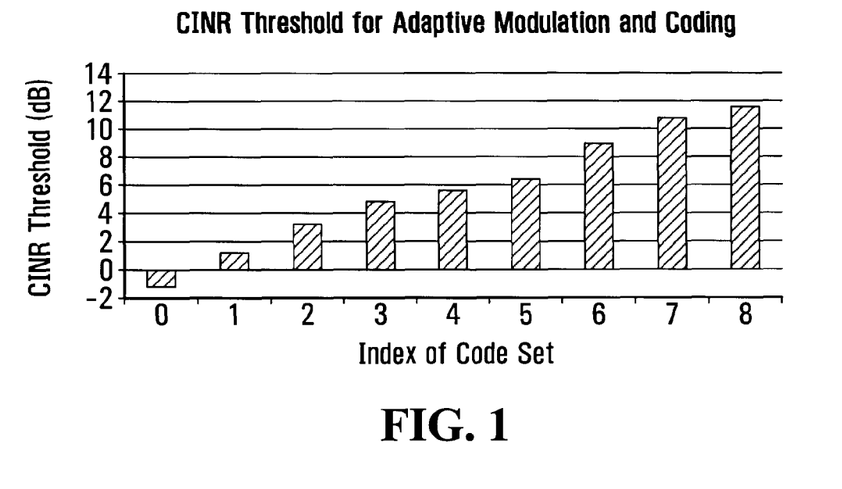
FIG. 1 is a chart showing CINR threshold for adaptive modulation and coding.

For rate control systems using a threshold table, the modulation and coding to use for downlink transmission to each receiver or uplink transmission from each transmitter (a typical UE (user equipment) comprising both receiver and transmitter functionality) is determined from time to time, for example on a slot-by-slot or on a transmission time interval (TTI) basis, a TTI being a set of slots, using reported or estimated CINR information. FIG. 1 shows an example of a set of CINR thresholds for adaptive modulation and coding as a function of the index of code set. Each index represents a more aggressive modulation and/or coding. Each combination of modulation and/or coding is referred to as an AMC (adaptive modulation and coding) code set. If the reported CINR is between about 1.5 and 3.5, then code set 1 is used, and so on. As shown, the maximum CINR threshold represented in the table is near 12 dB. For any reported CINR threshold above this value, code set 8 will be used. The transmission power will be wasted if the reported estimated CINR is over this maximum level. It is noted that for VoIP transmission, the maximum CINR threshold is even lower than that for data transmission.

According to embodiments of the invention, a technique to control the transmission power on top of rate control is provided, hereinafter referred to as Adaptive Power Control (APC). To begin, this approach as it applies to downlink transmission from a transmitter to multiple receivers will be described, for example from a base station to a set of mobile stations. Later, an example implementation suitable for uplink transmissions will be described.

With APC, an APC parameter is used that reflects channel conditions. This is reported back to the base station from mobile stations in respect of downlink transmissions. The APC parameter is indicative of downlink channel conditions. If the reported APC parameter indicates channel conditions are good enough that the maximum (i.e. most aggressive) AMC code set available for transmission to a given receiver could be effectively transmitted with less transmit power. Such a receiver is said to be in "APC mode" and is subject to having the power transmitted to that receiver reduced. The maximum AMC code set may be different for different receivers. If a given receiver is not in APC mode, the transmission power level may be raised (in case the previous transmit power is less than an allowed transmission power cap).

In a particular example, the APC parameter is CINR (carrier to interference and noise ratio), and the reported CINR is compared to an APC threshold set for each receiver. This threshold is used to determine whether or not a given receiver is in APC mode. APC mode occurs when the maximum AMC code set is being used, and the CINR indicates the maximum AMC code set could be transmitted using less transmit power. If a given receiver is in APC mode, the transmission power level is lowered.

The APC threshold may be determined in many ways. In one example, a constant CINR threshold is set, for example according to the maximum CINR threshold of the AMC code sets. In another example, an adaptive CINR threshold is used. For example, this might be initialized to the maximum CINR threshold of the AMC code sets and then adjusted based on received block error rate and/or channel variation or other parameters or coverage information. This could result in a different APC threshold for different receivers.

The transmission power cap (TPC) may be determined in many ways. In one example, TPC is an equal transmission power threshold for all receivers. This might for example be set to equal an allowed total maximum transmission power divided by the number of receivers that will be transmitted to during a given power control period. In another example the TPC is an adaptive transmission power threshold initialized by the allowed maximum transmission power and then adjusted based received block error rate and/or channel variation or other parameters.

Two specific examples of methods of determining the TPC for downlink (DL) transmissions are provided, expressed as $P_{TPC}(n)$ for receiver n.

In a first example, there is a TPC that is the same for all of a set of transmit sub-channels. This allows a sub-channelized transmission resource to be used in which during a given transmit period, a plurality of sub-channels are transmitted and each sub-channel is allocated to a receiver, possibly multiple sub-channels being allocated to the same receiver. There are numerous sub-channelization approaches. Examples can be found in Draft 3GPP TR 25.814 V7.0.0 (2006-06), and in commonly assigned PCT application no. PCT/CA2006/000461 hereby incorporated by reference in its entirety. The expression below assumes multiple sub-channels per receiver, say $N_{Act}$. The constant TPC can be selected to be the maximum transmission power, i.e., $$P_{TPC}(n) = \frac{P_{max}}{N_{SCh}} \times N_{Act}$$

where $P_{max}$ is the maximum transmit power, and $N_{SCh}$ is the total number of sub-channels for simultaneous data transmission during a given power control interval.

In a second example, the TPC is adaptively determined for each individual receiver. The adaptive TPC for each receiver is updated and scaled for each power control interval. In a particular example, there are two steps for the TPC adaptation. The first step is to update the $P_{TPC}(n)$ for each receiver based on received block error rate and/or channel variation (mainly long-term channel variation) or other parameters. The second step is to scale $P_{TPC}(n)$ for assigned receivers for a given period. For example, the total number of receivers are N, and only M receivers are assigned for data transmission, indicated by $\gamma_0, \gamma_0, \ldots, \gamma_{N-1}$, and $\gamma_n=1$ or 0. This means that when $\gamma_n=1$, the receiver n is assigned for data transmission, while when $\gamma_n=0$, the receiver n is not assigned for data transmission. The scaled TPC is $P'_{TPC}(n)=\alpha \cdot P_{TPC}(n)$, where $\alpha$ is defined as $$\alpha = \frac{P_{max}}{\sum_{n=0}^{N} \gamma_n \cdot P_{TPC}(n)}.$$

It should be noted that $$\sum_{n=0}^{N} \gamma_n$$

equals the number of active receivers, and the scaled TPC will be used for APC as a cap. Specifically, if transmission to a given active user is not at the maximum AMC, the transmission power is adjusted upwards subject to the cap. The next time a CINR reading is obtained, the increased power may allow the AMC to be increased and so on until the AMC is at the maximum AMC, or the transmit power hits the cap.

Figure 2:
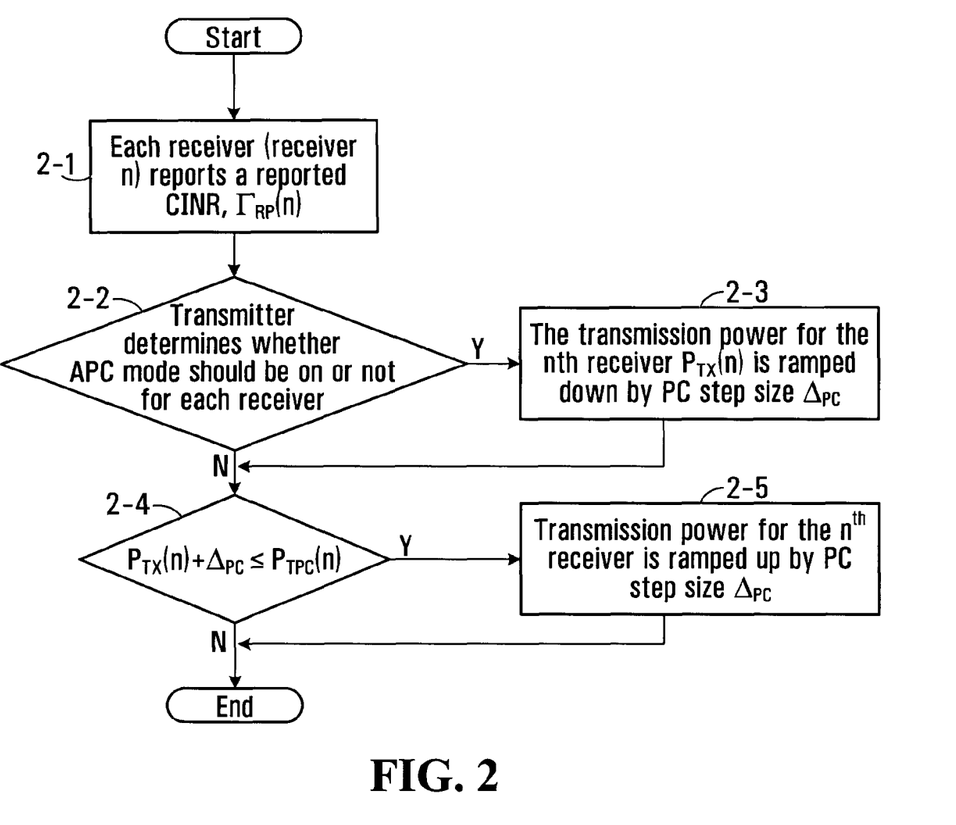
FIG. 2 is a flowchart of a method of performing adaptive power control.

A detailed APC algorithm implementation will now be described with reference to FIG. 2. To describe the APC algorithm, an APC threshold defined as a constant CINR is used, and a constant TPC is used, represented by $\Gamma_{TH}(n)$ and $P_{TPC}(n)$, respectively. A respective CINR is reported by each receiver.

At step 2-1, each receiver (receiver n) reports a reported CINR, $\Gamma_{RP}(n)$. At step 2-2, a transmitter determines whether APC mode should be on or not for each receiver. For example, if $\Gamma_{RP}(n) > \Gamma_{TH}(n)$, then APC mode is on, otherwise is off.

If APC mode is on, at step 2-3 the transmission power for the nth receiver $P_{TX}(n)$ is ramped down by PC step size $\Delta_{PC}$.

On the other hand, if APC mode is off, then at step 2-4, the previous transmission power level $P_{TX}(n)$ is checked to see if $P_{TX}(n) + \Delta_{PC} \leq P_{TPC}(n)$, the transmission power cap for user n. If so, the transmission power is ramped up by PC step size $\Delta_{PC}$ at step 2-5. Note that the step size used for increasing and decreasing the power need not necessarily be equal.

Figure 3:
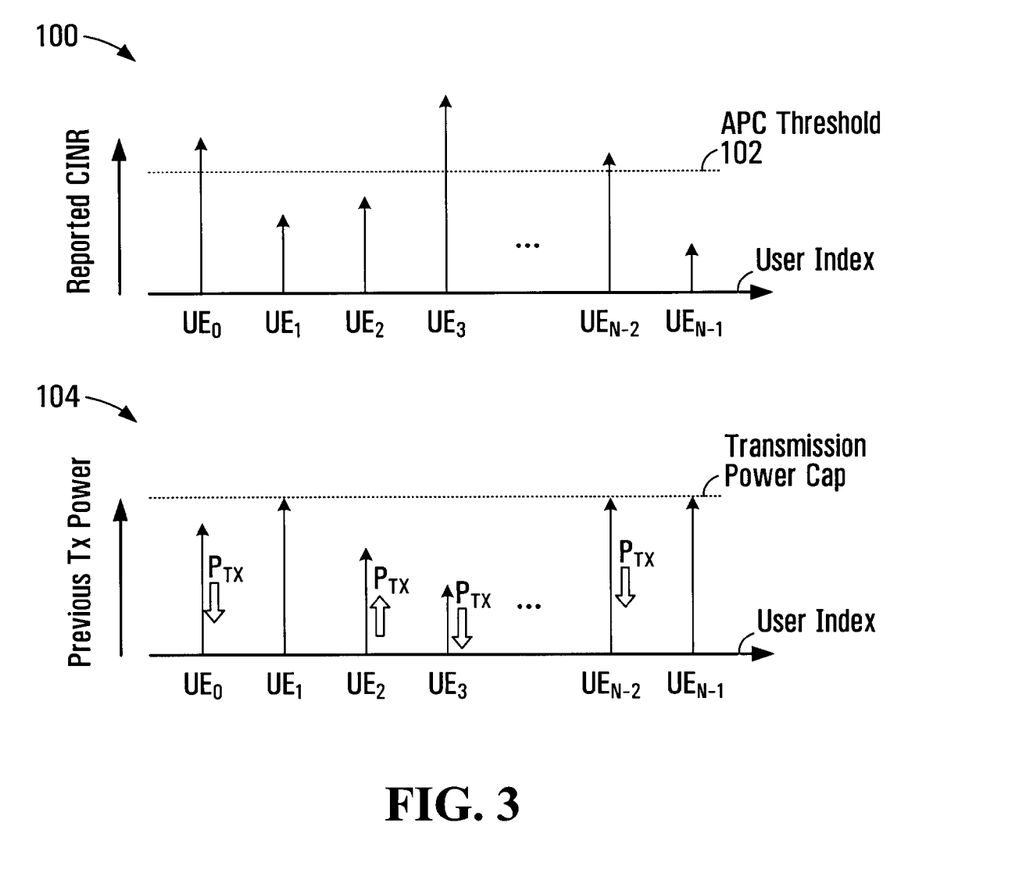
FIG. 3 contains two graphs showing an example of a relationship between reported CINR and APC threshold.

FIG. 3 provides an example of the above approach being applied. Generally indicated at 100 is the reported CINR for a set of user equipment (UE), and an example setting of a statically defined APC threshold indicated at 102.

There are UEs $UE_0$, $UE_3$ and $UE_{N-2}$ that are in the APC mode because they have reported CINR above the APC threshold 102. Such users may ramp their power down as described above. Power control may, for example, happen every slot/N slots/subframe/N sub-frames/TTI/N TTIs, or other implementation specifically defined basis, for example, every 0.5 msec for LTE and 0.6667 msec for UMTS release-6.

The reduction in transmit power for certain users will result in an overall transmit power that is less than a defined maximum. In such instances, there is extra power that may be allocated to users that are experiencing poor channel conditions as detailed below.

The remaining UEs $UE_1$, $UE_2$, ..., $UE_{N-1}$ are not in the APC mode and as such are not subject to having their transmit powers decreased, but may have their transmit powers increased.

Generally indicated at 104 is an example set of previous transmit powers corresponding to the above example, and the type of power control that would be performed for the current power control interval. For $UE_0$, $UE_3$, $UE_{N-2}$, all of which are above the APC threshold, their transmit powers can be decreased as indicated by the downward pointing arrows. This can be done because the maximum code set is being used, but due to good channel conditions, this maximum code set could be transmitted reliably using a lower transmit power.

$UE_1$ and $UE_{N-1}$ are not in APC mode, but they cannot have their transmit power increased because they are already transmitting at their transmission power cap.

$UE_2$ is not in the APC mode. However, it may ramp up the transmission power because the previous transmission power plus the power control step size is below the allowed transmission power cap.

APC for Uplink Transmissions

In some embodiments, for APC on the uplink, the system and method is slightly different since the base station is still in control. For uplink transmission, the base station can determine the APC parameter (such as CINR) for each transmitting UE, hereinafter transmitter. The base station can then make power control and AMC decisions as was the case for the downlink embodiment. The base station then signals the appropriate power control information to each transmitter. While potentially different caps, thresholds and AMC code sets might be available on the UL vs. the DL, the basic method that is applied is the same for both, as detailed above.

For UL power control, the power control commands are signalled to the mobile stations. Any appropriate signalling scheme may be used to signal power control commands. These may be two state (in which power must be signalled up or down every power control interval) or three state (in which there is at least one state in which power is kept constant).

Transmission power (TP) on the DL is quite different from TP on the UL. On the DL, the total transmission power from a base-station for all active users per OFDMA symbol is typically limited to be equal to or less than maximum transmission power regardless of the number of simultaneous active transmission users, while on the UL, each user could have maximum transmission power (or less than that). Therefore, on the UL, the total TP in each sector could be much larger than the individual maximum transmission power depending the number of simultaneous active transmit users. For example, there may be 24 sub-channels per TTI (corresponding to 10 MHz bandwidth in 3GPP Long Term Evolution (LTE) standard). If it is assumed that the number of simultaneously transmitting users is eight with each user occupying three sub-channels, and total transmission from eight users is equal to 8*max_power or less than that.

Determination of TPC for UL

Two methods of determining the TPC are also provided for uplink, again expressed as $P_{TPC}(n)$ for UL transmitter n.

In the first method, a constant TPC is assigned for all the UL transmitters. In some embodiments, the constant TPC is simply be the maximum transmission power, i.e., $$P_{TPC}(n) = P_{max}.$$

It is noted that the user transmission power on the UL is different on the DL, and each UL transmitter could always transmit maximum transmission power. However reducing the UL power of a given UL transmitter will still reduce the interference to other users.

In the second method, the TPC is adaptively controlled for each individual UL transmitter. For example the transmission power cap can initially be set to equal the maximum transmission power. If a coverage problem occurs or interference from other sectors is too strong (a kind of interference coordination scheme), the transmission power cap may be reduced by several dB. The APC methods provided can be applied not only to OFDMA but also to CDMA systems on both downlink and uplink provided rate control is employed in the transmitting system.

The above description assumes the BS is in control of UL power control. In another embodiment, power control is controlled by the mobile station. In this case, the methods used would be basically the same as described for the DL power control, but with the roles simply reversed.

The above described embodiments assume two types of power control. In the first type, that power is decreased when the maximum AMC could be transmitted with less transmit power, and in the second type, the power is increased when the maximum AMC is not being used, but there is room within a transmit power cap for a given user to increase the power. Some embodiments comprise the first type of power control.

Simulations

To investigate the performance of the APC approach, a system level simulation based on high speed OFDMA (orthogonal frequency division multiple access) packet access (HSDPA) on the uplink is used. Below is described an example frame structure for OFDMA. Following that, simulation assumptions are provided. Finally, the simulation results and addition discussions are provided.

Figure 4:
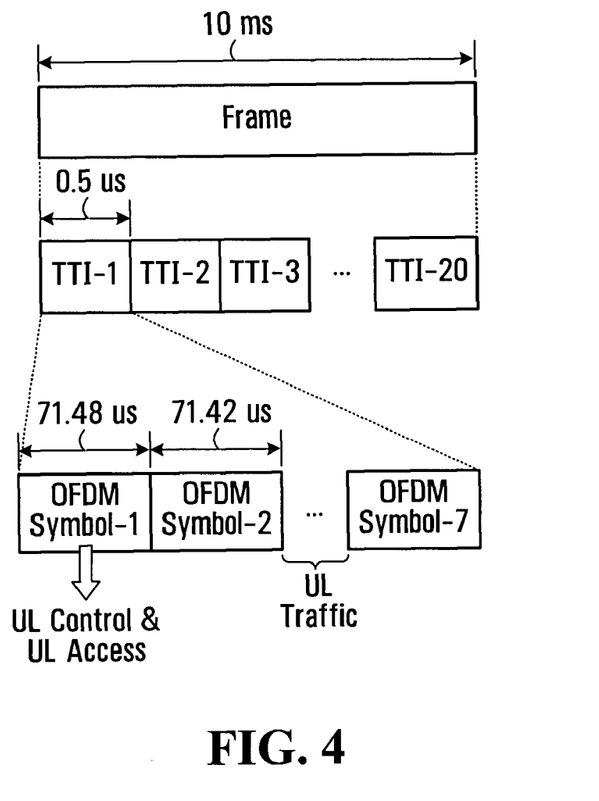
FIG. 4 shows an uplink OFDM frame structure and an example of power control adjustments made as a function of previous transmit power and transmission power cap.

According to an embodiment of the invention the frame structure used for system level simulation is that shown in FIG. 4. This is based on the 10 msec frame that contains 20 TTIs. Each TTI is 0.5 ms in duration and includes 7 OFDM symbols. The first symbol may be used as a control channel and the rest may be used for data transmission including pilots.

Figure 5:
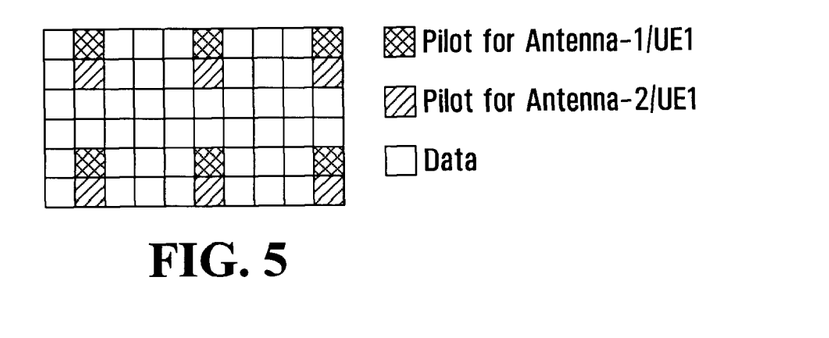
FIG. 5 shows an example of sub-channelization of OFDM.

An example of the sub-channelization formed in each TTI is shown in FIG. 5. Each sub-channel may include 48 data tones and 12 pilot tones. Multiple sub-channels can be simultaneously transmitted using different sets of tones.

The detailed frame configuration in terms of the number of sub-channels per TTI is listed in Table 1 below.

TABLE 1

| Example Frame configuration of OFDMA system | |
|---|---|
| Number of Symbols per TTI | 7 |
| Number of Control Symbols per TTI | 1 |
| Number of Data Symbols per TTI | 6 |
| Number of Sub-Channel per TTI | 60 |
| Bandwidth | 10 MHz |
| Useful Bandwidth | 9.03 MHz |
| IFFT/FFT Block | 1024 |

The system level simulation assumptions for the uplink are set out in Table 2 below.

TABLE 2

| System level simulation assumptions for Uplink | |
|---|---|
| Number of Cells | 19 |
| Number of UEs | 20 |
| Antenna Structure | 1 × 2 |
| Maximum Retransmission Number | 3 |
| Center Frequency | 2.3 GHz |
| Transmission Power | 200 mWatts (23 dBm) |
| Lognormal Shadowing | 8 dB |
| Noise Figure | 9 dB |
| Antenna Gain | −1 dBi |
| Maximum CIR | 30 dB |
| Path-Loss | $128.1 + 37.6\log_{10}(R)$, R in km |
| Site-to-Site Distance | 2.8 km |
| Scheduler | PF (proportional fairness) |

Table 3 provides a set of example code sets in terms of channel encoding block length, modulation, channel code rate, and data transmission that was used for the simulations. More generally, a set of code sets may be employed.

TABLE 3

AMC code set assumptions for proportional fairness scheduling.

| Channel Encoding Block Length (bits) | Number of Sub-Channels | Modulation Method | Channel Code Rate |
|---|---|---|---|
| 480 | 10 | QPSK | 1/3 |
| 480 | 10 | QPSK | 1/2 |
| 480 | 10 | QPSK | 2/3 |
| 720 | 15 | QPSK | 3/4 |
| 960 | 20 | QPSK | 4/5 |
| 960 | 20 | 16QAM | 1/2 |
| 960 | 20 | 16QAM | 2/3 |
| 1200 | 25 | 16QAM | 3/4 |
| 1440 | 30 | 16QAM | 4/5 |

A mixed channel model with assignment probability is listed in Table 4 was also considered in the system level simulation. The mixed channel model means that in each sector there are multiple users. Some user belongs to channel model A, some to model B, and some to model C, and so on. The probability of the channel model for all the users is based on assignment probability listed in the table below.

TABLE 4

Channel Model.

| Channel Model | # of fingers | Speed (km/h) | Fading Model | Assignment Probability |
|---|---|---|---|---|
| Model A | 4 | 3 | JTC | 0.3 |
| Model B | 6 | 10 | JTC | 0.3 |
| Model C | 6 | 30 | JTC | 0.2 |
| Model D | 6 | 120 | JTC | 0.1 |
| Model E | 1 | 0 | JTC | 0.1 |

Figure 6:
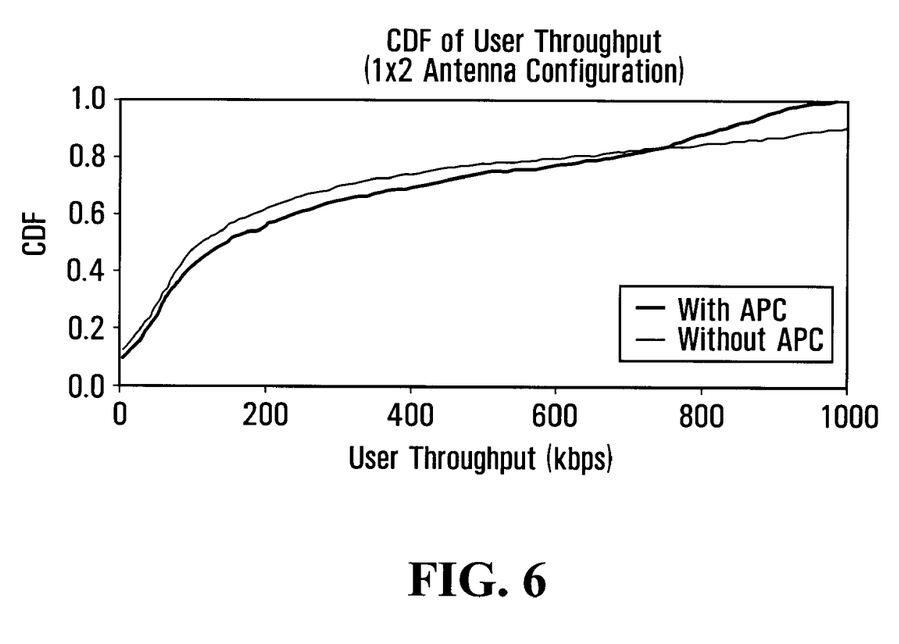
FIG. 6 contains plots of a CDF of user throughput with 1×2 antenna configuration and proportional fairness scheduler with and without APC.

FIG. 6 shows the CDF (cumulative distribution function) of user throughput with 1×2 antenna configuration and PF scheduling with and without APC as defined herein. As shown, with APC the user coverage is much better than without APC (e.g. the number of users with 95% of maximum throughput is much larger). The aggregated sector throughput is almost identical—both achieving 6.1 Mbps sector throughput.

Figure 7:
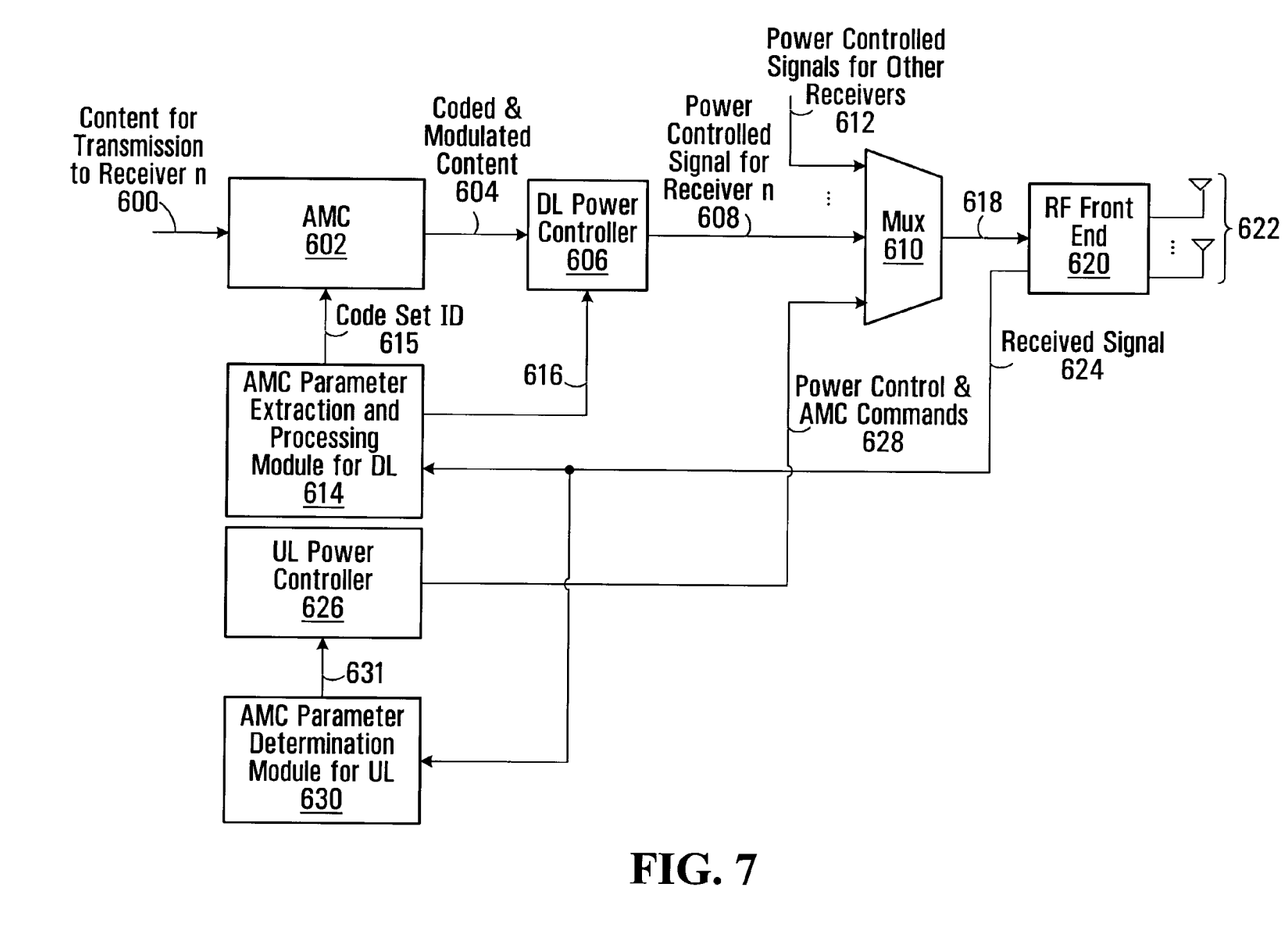
FIG. 7 is a block diagram of an example implementation for a base station.

Referring now to FIG. 7, shown is a block diagram of an example implementation for a base station in which both power control and adaptive modulation and coding are performed for both uplink and downlink transmissions. Content for transmission to receiver n is indicated at 600. This is adaptively modulated and coded with adaptive modulation and coder 602 to produce coded and modulated content at 604. This is subject to power control by downlink power controller 606 which produces a power controlled signal 608 for receiver n. This signals input to a multiplexer 610. The power controlled signal for other receivers are also indicated at 612. The output of the multiplexer 610 is indicated at 618 and this is forwarded to an RF front end 620 from which it is transmitted over one or more antennas 622. A received signal 624 received through the RF front end 620 is processed in an AMC parameter extraction and processing module for downlink as indicated at 614. This produces a code set ID 615 that is fed to the AMC 602 to select which AMC code set to use.

The AMC parameter extraction and processing module 614 also passes the extracted AMC parameter to the downlink power controller 606 where power control is applied to the coded and modulated content 604 in accordance with any of the methods as described above.

The received signal 624 is also passed to an AMC parameter determination module for UL 630 which measures an AMC parameter in respect of the received signal 624. This is passed at 631 to an uplink power controller 626 which produces power control commands and AMC commands indicated at 628. These are also input to the multiplexer 610. The multiplexer 610 performs multiplexing operation on the power controlled signals 608,612 and the power control commands and the AMC commands 628 to produce the overall multiplexer output signal 618. Note that the multiplexer 610 may for example perform a multiplexing using OFDM technology or CDMA technology to name a few examples.

In FIG. 7, a very specific block diagram has been shown with specific connections. Of course it is to be understood that some of these connections can be physical or logical. Various components can be combined. For example, there may be a single power controller that performs the functionality for both uplink and downlink. Not shown is the further processing of received signals to extract uplink content.

The base station produces a composite signal that is transmitted for multiple receivers. The composite signal contains a respective component for each of the multiple receivers, each component being transmitted with the transmit power determined for that receiver. Each component might be used to transmit a respective packet or a portion of a packet. In some embodiments, the packet is a data packet. In other embodiments, the packet is a VoIP packet. Some implementations support both data packets and VoIP packets.

For the uplink processing, the base station receives a composite signal for multiple receivers. The composite signal contains a respective component for each of the multiple transmitters added together over the air, each component having being transmitted with the transmit power determined for that transmitter. Each component might for example have been used to transmit a respective packet or a portion of a packet. In some embodiments, the packet is a data packet. In other embodiments, the packet is a VoIP packet. Some implementations support both data packets and VoIP packets.

Figure 8:
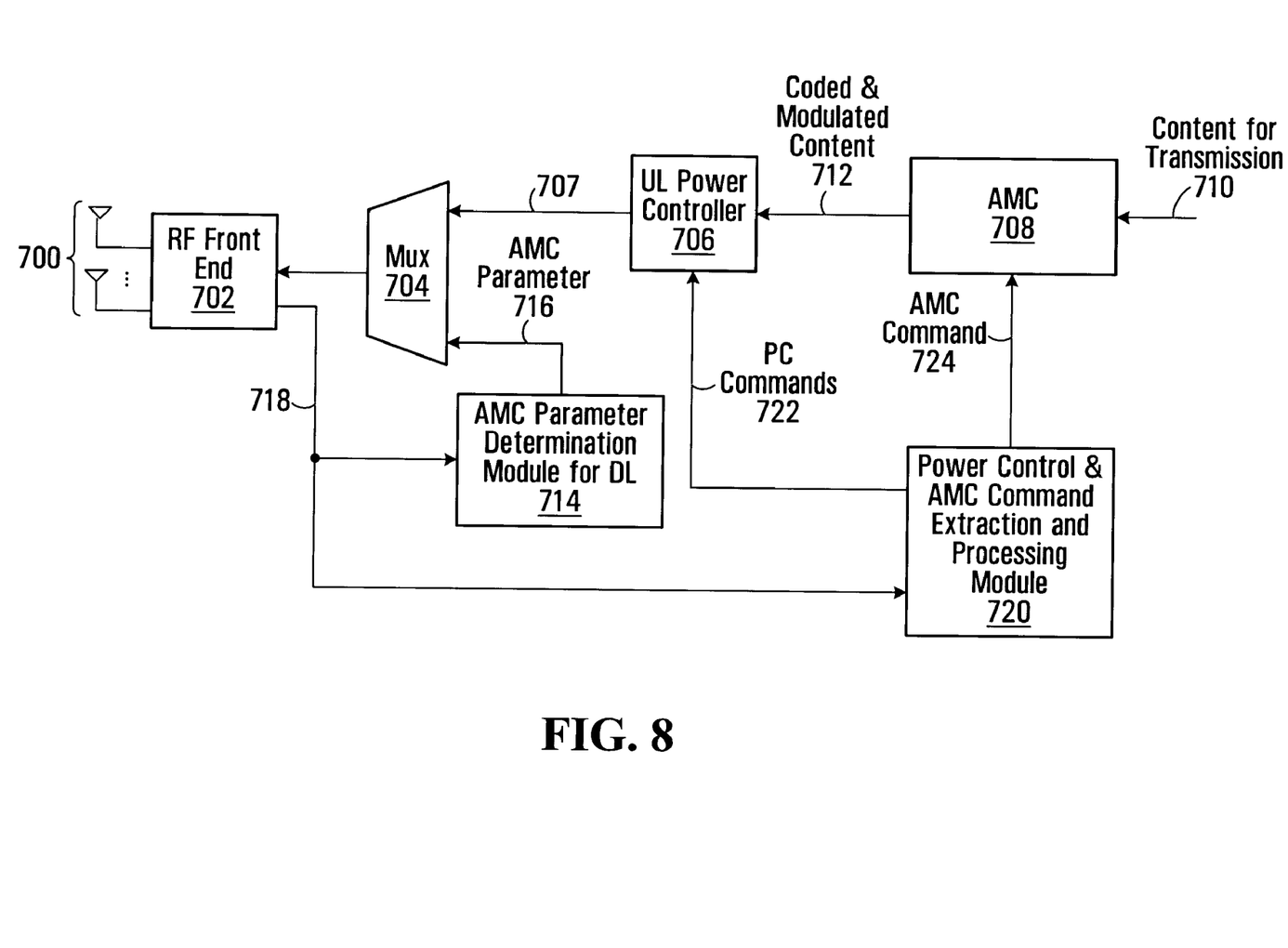
FIG. 8 is a block diagram of an example implementation of a mobile station.

Referring now to FIG. 8, shown is a block diagram of a mobile station. Content for transmission by the mobile station is indicated generally at 710 and this is input to an AMC 708 which produces coded and modulated content 712. This is forwarded to an uplink power controller 706 which produces a power controlled signal 707 that is input to multiplexer 704. The output of the multiplexer 704 is input to RF front end 702 for transmission on one or more antennas 700. A receive signal 718 received through the RF front end 702 is processed by AMC parameter determination module for DL 714. This module determines the AMC parameter in respect of signals received by the mobile station on the downlink and the AMC parameter thus determined is forwarded at 716 to the multiplexer 704 for transmission on the uplink. In addition, the received signal 718 is processed by power control and AMC command extraction and processing module 720 to extract power control commands 722 for forwarding to the UL power controller 706 to control the power of the signal transmitted by the mobile station, and AMC commands 724 that are used in the AMC 708 to select the adaptive modulation and coding to be applied.

In FIG. 8, a very specific block diagram has been shown with specific connections. Of course it is to be understood that some of these connections can be physical or logical. Note that further details of the extraction of downlink signals for use by the mobile station are not shown.

Numerous modifications and variations of the present invention are possible in light of the above teachings. It is therefore to be understood that within the scope of the appended claims, the invention may be practiced otherwise than as specifically described herein.

We claim:

1. A method comprising:
   receiving a respective reported AMC (adaptive modulation and coding) parameter from each of a plurality of receivers;
   decreasing a transmit power used to transmit to a given receiver of the plurality of receivers when the reported AMC parameter received from that receiver reflects better channel conditions than needed for a highest available AMC code set for that receiver;
   for at least one receiver, adaptively setting a transmission power cap for the receiver, subject to an overall maximum transmit power constraint for the plurality of receivers collectively; and
   increasing a transmit power used to transmit to a given receiver of the plurality of receivers when the reported AMC parameter received from that receiver is below an APC (adaptive power control) threshold for the receiver, subject to the transmission power cap for the given receiver.

2. The method of claim 1 further comprising:
   determining an AMC code set to use for transmissions to each receiver based on the respective reported AMC parameter.

3. The method of claim 1 further comprising:
   transmitting a composite signal for multiple receivers of said plurality of receivers, the composite signal containing a respective component for each of the multiple receivers, each component being transmitted with the transmit power determined for that receiver.

4. The method of claim 3 wherein each component is used to transmit a respective data packet or portion of a packet.

5. The method of claim 3 wherein the composite signal comprises an OFDM signal, and wherein each respective component comprises at least one sub-channel defined within the OFDM signal.

6. The method of claim 1 wherein the reported AMC parameter is a reported CINR (carrier to interference and noise ratio), and the method further comprising:
   for each receiver, comparing the reported CINR to an AMC threshold for the receiver to determine whether the receiver has a reported AMC parameter reflecting better channel conditions than needed for the highest available AMC code set for that receiver.

7. The method of claim 1 further comprising:
   setting the transmission power cap to be an equal value for a set of the receivers.

8. The method of claim 1 wherein adaptively setting the transmission power cap for at least one receiver comprises:
   determining a value from received block error rate and/or channel variation and/or coverage information;
   scaling the value determined so as to reflect how many receivers will be transmitted to during a given period to produce the transmission power cap.

9. A method comprising:
   determining an AMC (adaptive modulation and coding) parameter for each of a plurality of transmitters;
   sending a power control command to decrease a transmit power used to transmit by a given transmitter of the plurality of transmitters when the AMC parameter determined for that transmitter reflects better channel conditions than needed for a highest available AMC code set for that transmitter;
   for at least one transmitter, adaptively setting a transmission power cap for the transmitter, subject to an overall maximum transmit power constraint for the plurality of transmitters collectively; and
   sending a power control command to increase a transmit power used to transmit by a given transmitter of the plurality of transmitters when the AMC parameter determined for that transmitter is below an APC (adaptive power control) threshold for the transmitter, subject to the transmission power cap for the given transmitter.

10. The method of claim 9 further comprising:
    receiving a composite signal for multiple transmitters of said plurality of transmitters, the composite signal containing a respective component for each of the multiple transmitters added together over the air, each component being transmitted with the transmit power determined for that transmitter.

11. The method of claim 10 wherein each component is used to transmit a respective packet or portion of a packet.

12. The method of claim 11 wherein the composite signal comprises an OFDM signal, and wherein each respective component comprises at least one sub-channel defined within the OFDM signal.

13. The method of claim 9 wherein the determined AMC parameter is a CINR (carrier to interference and noise ratio), and the method further comprising:
    for each transmitter, comparing the determined CINR to an AMC threshold for the transmitter to determine whether the transmitter has a AMC parameter reflecting better channel conditions than needed for the highest available AMC code set for the transmitter.

14. The method of claim 9 further comprising:
    setting the transmission power cap to be an equal value for a set of the transmitters.

15. A transmitter comprising:
    an adaptive modulation and coder that performs adaptive modulation and coding using a selected AMC code set;
    a first power controller that performs power control for transmissions as a function of a first AMC parameter to produce a power controlled signal;
    at least one antenna for transmitting the power controlled signal,
    wherein, for a plurality of receivers, the first power controller is configured to:
       decrease a transmit power used to transmit to a given receiver of the plurality of receivers when an AMC parameter for that receiver reflects better channel conditions than needed for a highest available AMC code set for that receiver;
       adaptively set a transmission power cap for at least one receiver of the plurality of receivers subject to an overall maximum transmit power constraint for the plurality of receivers collectively; and
       increase a transmit power used to transmit to a given receiver of the plurality of receivers when an AMC parameter for that receiver is below an APC (adaptive power control) threshold for the receiver, subject to the transmission power cap for the given receiver.

16. A mobile station comprising the transmitter of claim 15 further comprising:
    an AMC parameter determination module for DL that determines an AMC parameter for DL in respect of a received signal and sends this to a base station;

the mobile station further comprising:
a power control and AMC command extraction and processing module that extracts AMC commands and power control commands from the received signal;
an adaptive modulation and coder that performs adaptive modulation and coding using a code set identified by the AMC command;
wherein the first power controller is a UL power controller that performs power control using the power control commands to produce the power controlled signal;
wherein the at least one antenna is used for receiving the received signal and transmitting the power controlled signal.

17. A base station comprising the transmitter of claim 15 wherein:
an AMC (adaptive modulation and coding) parameter extraction and processing module for DL (downlink) that extracts the first AMC parameter as an AMC parameter for DL from a received signal and determines the selected AMC code set use in transmissions to a given receiver;
the first power controller is a DL power controller that performs DL power control for downlink transmissions as a function of the AMC parameter for DL to produce the power controlled signal.

18. The base station of claim 17 further comprising:
an AMC parameter determination module for UL (uplink) that determines an AMC parameter for UL in respect of a received signal; and
a UL power controller that performs UL power control as a function of the AMC parameter for UL;
wherein the at least one antenna is used for receiving the received signal and transmitting the power controlled signal.

19. The base station of claim 18 wherein:
the DL power controller performs DL power control for downlink transmissions as a function of the AMC parameter for DL by:
a) decreasing a transmit power used to transmit to a given receiver of the plurality of receivers when the reported AMC parameter for DL received from that receiver reflects better channel conditions than needed for a highest available AMC code set for the receiver; and
b) increasing a transmit power used to transmit to a given receiver of the plurality of receivers when the reported AMC parameter for DL received from that receiver is below an APC (adaptive power control) threshold for the receiver, subject to a transmission power cap for the given receiver;
the UL power controller power control performs UL power control as a function of the AMC parameter for UL by:
c) sending a power control command to decrease a transmit power used to transmit by a given transmitter of the plurality of transmitters when the AMC parameter for UL determined for that transmitter reflects better channel conditions than needed for a highest available AMC code set for the transmitter; and
d) sending a power control command to increase a transmit power used to transmit by a given transmitter of the plurality of transmitters when the AMC parameter for UL determined for that transmitter is below an APC (adaptive power control) threshold for the transmitter, subject to a transmission power cap for the given transmitter.

* * * * *